(12) United States Patent
Hase et al.

(10) Patent No.: US 9,360,216 B2
(45) Date of Patent: Jun. 7, 2016

(54) GAS TURBINE

(71) Applicant: MITSUBISHI HEAVY INDUSTRIES AERO ENGINES, LTD, Aichi (JP)

(72) Inventors: Takaaki Hase, Tokyo (JP); Yoshihiro Kuwamura, Tokyo (JP); Osamu Morii, Tokyo (JP); Tadayuki Hanada, Tokyo (JP); Hirokazu Hagiwara, Tokyo (JP)

(73) Assignee: Mitsubishi Heavy Industries Aero Engines, Ltd., Aichi (JP)

( * ) Notice: Subject to any disclaimer, the term of this patent is extended or adjusted under 35 U.S.C. 154(b) by 0 days.

(21) Appl. No.: 13/904,226

(22) Filed: May 29, 2013

(65) Prior Publication Data

US 2014/0020392 A1     Jan. 23, 2014

(30) Foreign Application Priority Data

Jul. 19, 2012   (JP) ................ 2012-160904

(51) Int. Cl.
| | |
|---|---|
| *F02C 3/04* | (2006.01) |
| *F23R 3/02* | (2006.01) |
| *F01D 5/14* | (2006.01) |
| *F01D 11/00* | (2006.01) |
| *F01D 25/12* | (2006.01) |
| *F01D 11/08* | (2006.01) |

(52) U.S. Cl.
CPC . *F23R 3/02* (2013.01); *F01D 5/143* (2013.01); *F01D 11/001* (2013.01); *F01D 25/12* (2013.01); *F01D 11/08* (2013.01)

(58) Field of Classification Search
CPC ....... F01D 11/011; F01D 5/081; F01D 11/08; F01D 11/005
USPC .............. 60/752, 805, 806; 415/173.1–173.6
See application file for complete search history.

(56) References Cited

U.S. PATENT DOCUMENTS

| | | | | | |
|---|---|---|---|---|---|
| 5,217,348 | A | * | 6/1993 | Rup et al. ................ | 415/115 |
| 5,470,198 | A | * | 11/1995 | Harrogate et al. ........... | 415/115 |
| 6,481,959 | B1 | * | 11/2002 | Morris et al. .............. | 415/115 |
| 7,578,653 | B2 | * | 8/2009 | Klasing et al. ............. | 415/115 |
| 2008/0053107 | A1 | * | 3/2008 | Weaver et al. ............. | 60/800 |
| 2010/0008760 | A1 | * | 1/2010 | Morris et al. ............. | 415/115 |
| 2010/0074733 | A1 | * | 3/2010 | Little ...................... | 415/173.5 |
| 2011/0293402 | A1 | * | 12/2011 | Kreiselmaier et al. ....... | 415/116 |

FOREIGN PATENT DOCUMENTS

| | | |
|---|---|---|
| EP | 2 439 376 A1 | 4/2012 |
| JP | 3-17201 | 2/1991 |
| JP | 08-121192 | 5/1996 |

(Continued)

OTHER PUBLICATIONS

Notice of Allowance issued Jan. 28, 2014 in corresponding Japanese Application No. 2012-160904 with English translation.

*Primary Examiner* — Gerald L Sung
(74) *Attorney, Agent, or Firm* — Wenderoth, Lind & Ponack, L.L.P.

(57) ABSTRACT

A gas turbine includes downstream side members that face a passage and have guide faces arranged in the passage side as it goes toward the upstream side. In a cross section including an axis center of a rotor shaft extending in a flow direction of a gas main stream, extension sections of the guide faces continuing to the upstream end portion of the guide faces are arranged downstream from the cavity inner wall portion of the upstream side member facing the cavities.

32 Claims, 6 Drawing Sheets

(56) References Cited

FOREIGN PATENT DOCUMENTS

| | | |
|---|---|---|
| JP | 2000-034902 | 2/2000 |
| JP | 2000-230401 | 8/2000 |
| JP | 3226543 | 11/2001 |
| JP | 2002-500313 | 1/2002 |
| JP | 2009-013837 | 1/2009 |
| JP | 2009-097396 | 5/2009 |
| WO | 2011/138193 | 11/2011 |

* cited by examiner

GAS TURBINE

BACKGROUND OF THE INVENTION

1. Technical Field

The present invention relates to a gas turbine. Priority is claimed on Japanese Patent Application No. 2012-160904, filed Jul. 19, 2012, the content of which is incorporated herein by reference.

2. Background Art

A gas turbine includes a compressor which compresses air for combustion, a combustor which injects a fuel into the air compressed by the compressor and burns the fuel, and a turbine which is driven by a high-temperature combustion gas burned by the combustor. In the gas turbine, cavities are often defined such as between respective modules of the combustor and the turbine, between respective modules of a high-pressure turbine and a low-pressure turbine included in the turbine, and between shrouds disposed at vanes of the turbine and platforms and shrouds disposed at blades.

The cavity communicates with a main flow passage of the gas turbine in which the combustion gas flows, and the combustion gas of the main flow passage is entrained. Because the combustion gas is flowed into the cavity due to the entrainment of the combustion gas, the flow rate of the combustion gas flowing in the main flow passage is lowered, and thereby the efficiency of gas turbine is decreased.

When the combustion gas is flowed into the cavity, the temperature of inner parts such as a turbine disc increases, shortening the life of the parts. Thereby, a method of suppressing the rise in temperature of the inner parts of the cavity may be considered by increasing the flow rate of cooling air that cools the inner parts in the cavity. However, if the flow rate of the cooling air increases, the cooling air mixed in the combustion gas increases, which decreases the efficiency of gas turbine.

Japanese Patent No. 3226543 discloses a structure in which a clearance of an opening portion is narrowed as much as possible by installing a knife edge seal in end portions of platforms of blades facing shrouds of vanes, whereas disposing an abradable surface in the end portions of the vanes facing the knife edge seal, in order to prevent a working fluid which is the combustion gas from entering the cavity.

Further, Japanese Unexamined Patent Application, First Publication No. 2009-97396 discloses that an opening portion of a cavity approaching a main flow passage is made in a labyrinth structure, in order to prevent the combustion gas from entering the cavity.

However, in the above-mentioned gas turbine, for example, the end portions of the shrouds of the vanes and the end portions of the platforms of the blades may come in contact in the opening portion of the cavity, if so-called thermal extension due to a thermal expansion occurs when the clearance of the opening portion of the cavity is made small. In efforts to reduce the entrainment of combustion gas while allowing thermal extension, the structure of the cavity opening may become complicated.

Further, when the opening portion of the cavity is designed such that contact by the thermal extension is allowed therein, the exchange of worn parts, or the like may become necessary and the frequency of maintenance may increase.

SUMMARY OF INVENTION

In consideration of the above-mentioned circumstances, it is an object of the present invention to provide a gas turbine whereby it is possible to suppress the narrowing of a clearance in an opening portion of a cavity and also reduce the inflow of the combustion gas into the cavity.

According to a first aspect of the present invention, a gas turbine includes an upstream side member facing a passage of a gas main stream; and a downstream side member disposed downstream from the upstream side member to define a cavity with the upstream side member; wherein the downstream side member faces the passage and has a guide face arranged in the passage side as it goes toward the upstream side, and in a cross section including an axis center of a rotor shaft extending in a flow direction of the gas main stream, an extension section of the guide face continuing to the upstream end portion of the guide face is arranged downstream from a wall portion of the upstream side member facing the cavity.

With this configuration, a swirling current due to the entrainment of the gas main stream flows along the guide face and the extension section of the guide face continuing to the upstream end portion of the guide face. Therefore, it is possible to reduce collision of the swirling current due to the entrainment of the gas main stream with the wall portion facing the cavity of the upstream side member forming the opening portion of the cavity so as to cause the gas main stream to flow into the cavity.

In the aforementioned gas turbine, the gas turbine may include a combustor which injects a fuel into compressed air to burn the fuel, and a turbine part disposed adjacent to downstream side of the combustor along the gas main stream, wherein the upstream side member may be disposed at the combustor, and the downstream side member may be disposed at the turbine part.

With this configuration, it is possible to reduce the inflow of the gas main stream by the entrainment into the cavity formed between modules of the combustor and the turbine part.

In the aforementioned gas turbine, the gas turbine may include a turbine part in which a vane part and a blade part are arranged in the flow direction of the gas main stream, wherein the upstream side member may be disposed at any one of the vane part and the blade part, which is arranged upstream along the gas main stream, and the downstream side member may be disposed at the other one thereof.

With this configuration, it is possible to reduce the inflow of the gas main stream due to the entrainment into the cavity formed between the vane part and blade part of the turbine part.

In the aforementioned gas turbine, a first turbine part and a second turbine part may be arranged in sequence from the upstream side of the flow direction of the gas main stream, the upstream side member may be disposed at the first turbine part, and the downstream side member may be disposed at the second turbine part.

With this configuration, it is possible to reduce the inflow of the gas main stream due to the entrainment into the cavity formed between the modules of the first turbine part and the second turbine part.

In the aforementioned gas turbine, the upstream side member and the downstream side member may be formed in at least one of an inner side and an outer side of the passage in the radial direction.

With this configuration, it is possible to reduce the inflow of the gas main stream into the cavity, in one of the cases in which the cavity is formed in the inner side in the radial direction of the passage in which the gas main stream is flowing, the case in which the cavity is formed in the outer side, and the case in which the cavity is formed in both the inner side and the outer side.

In accordance with the gas turbine described above, it is possible to suppress the narrowing of the clearance in the opening portion of the cavity, while reducing the inflow of the combustion gas into the cavity.

DETAILED DESCRIPTION OF THE INVENTION

Next, a gas turbine in a first embodiment of the present invention will be described with reference to the drawings.

Figure 1:
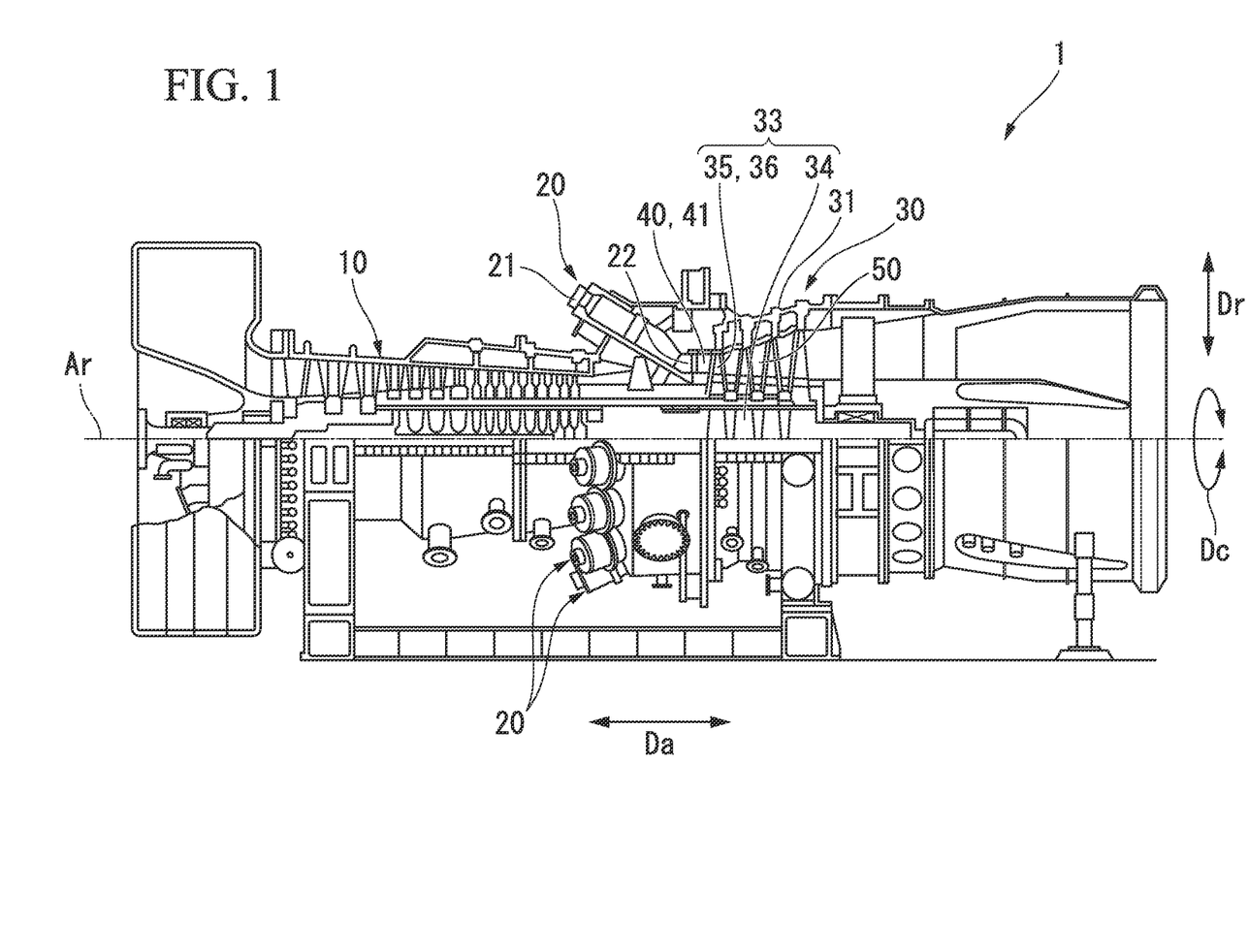
FIG. 1 is a view showing the overall configuration of a gas turbine in an embodiment of the present invention.

FIG. 1 is a view showing the overall configuration of a gas turbine 1 in this embodiment.

As shown in FIG. 1, the gas turbine 1 includes a compressor 10 which compresses ambient air to generate compressed air, a plurality of combustors 20 which inject and mix a fuel from a fuel supply source (not shown) into the compressed gas and burn the fuel to generate a combustion gas, and a turbine 30 (a turbine part) driven by the combustion gas.

Figure 3:
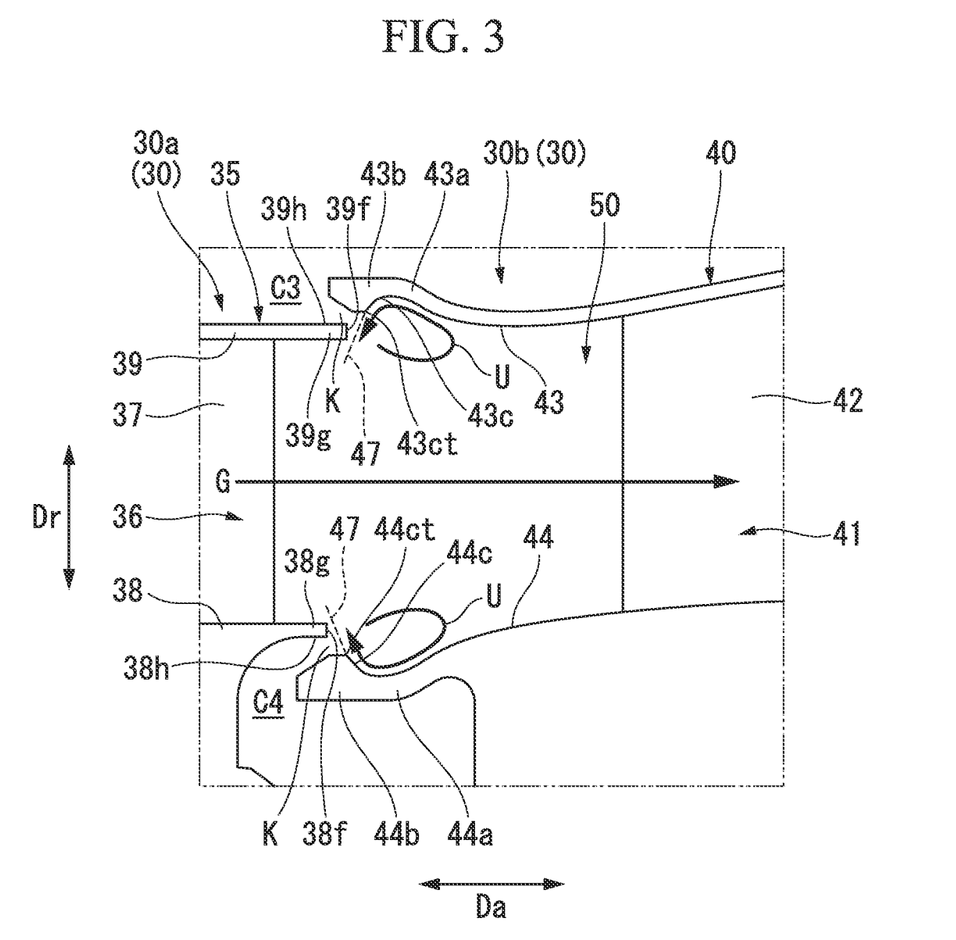
FIG. 3 is a cross-sectional view showing a cavity defined between respective modules of the high-pressure turbine and a low-pressure turbine in the gas turbine.

Further, the turbine 30 includes a plurality of turbine modules, and more specifically a combination of respective modules of a high-pressure turbine 30a (a first turbine part) (see FIG. 3) and a low-pressure turbine 30b (a second turbine part) (see FIG. 3).

The turbine 30 includes a casing 31 and a turbine rotor 33 rotating about a rotor shaft Ar in the casing 31. The compressor 10 is arranged on one side of an axial direction Da parallel to the rotor shaft Ar with respect to the turbine 30. The casing 31 of the turbine 30 has a substantially cylindrical shape about the rotor shaft Ar. The plurality of combustors 20 are mounted in the casing 31 at intervals in a circumferential direction Dc with respect to the rotor shaft Ar. Meanwhile, in the following description, it is assumed that the side on which the compressor 10 is arranged in the axial direction Da is an upstream side, and the opposite side thereof is a downstream side. Further, in a radial direction Dr with respect to the rotor shaft Ar, it is assumed that the side away from the rotor shaft Ar is an outside in the radial direction and the side close to the rotor shaft Ar is an inside in the radial direction.

Figure 4:
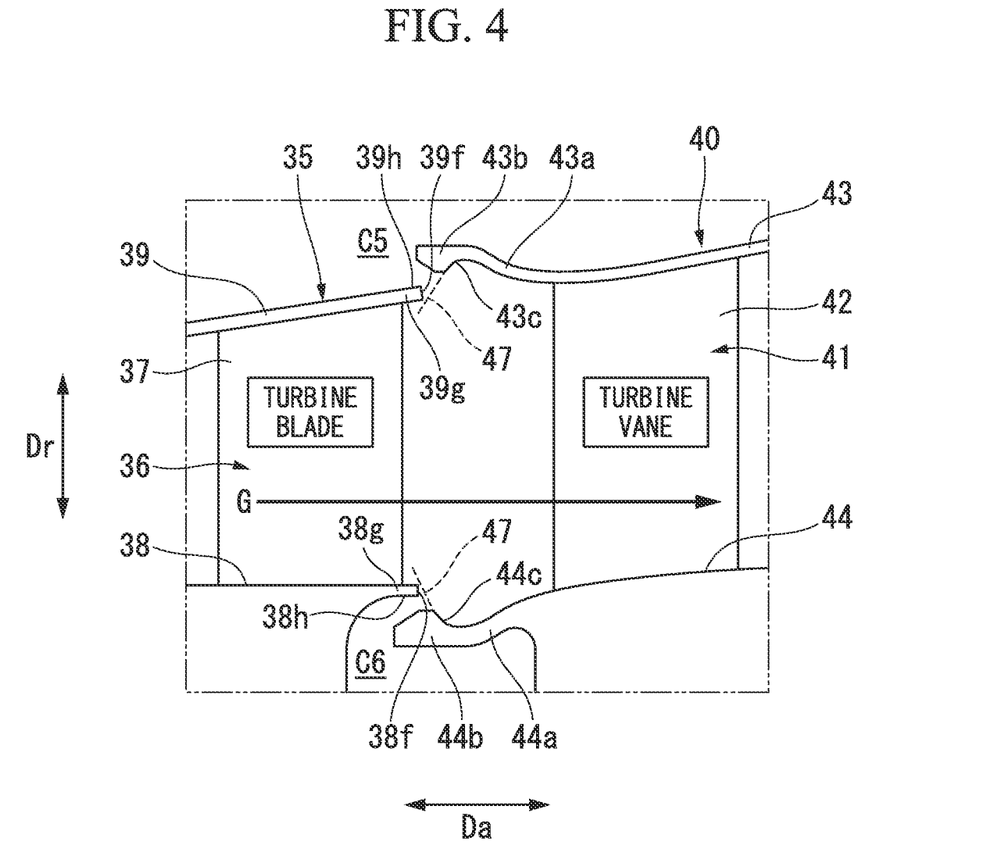
FIG. 4 is a cross-sectional view showing a cavity defined between a blade cascade and a vane cascade in the high-pressure turbine or the low-pressure turbine.
Figure 5:
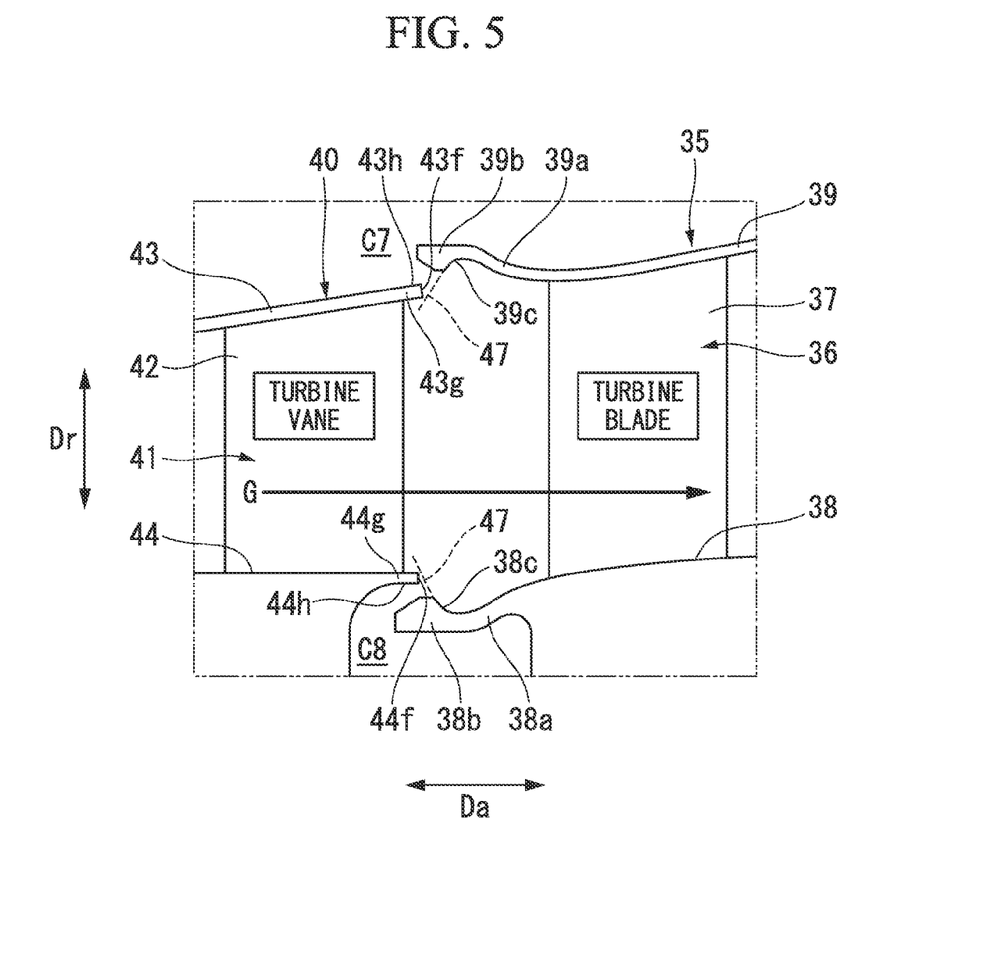
FIG. 5 is a cross-sectional view showing the cavity defined between the vane cascade and the blade cascade in the high-pressure turbine or the low-pressure turbine.

The turbine rotor 33 has a rotor body 34 extending in the axial direction Da about the rotor shaft Ar and a plurality of blade cascades (blade parts) 35 that are mounted on the rotor body 34 side by side in the axial direction Da. Referring to FIGS. 4 and 5, each blade cascade 35 has a plurality of blades 36 mounted on the rotor body 34 side by side in the circumferential direction Dc with respect to the rotor shaft Ar. Each blade 36 has a blade body 37 extending in the radial direction Dr, a platform 38 disposed at the inside in the radial direction of the blade body 37, a shroud 39 disposed at the outside in the radial direction of the blade body 37, and a blade root (not shown) disposed at the inside in the radial direction of the platform 38. The blade root is embedded in the rotor body 34, whereby the blade 36 is fixed to the rotor body 34.

Vane cascades (vane parts) 40 are arranged upstream from each of the plurality of blade cascades 35. Each vane cascade 40 has a plurality of vanes 41 arranged side by side in the circumferential direction Dc. Each vane 41 has a vane body 42 extending in the radial direction Dr, an outer shroud 43 disposed at the outside in the radial direction of the vane body 42, and an inner shroud 44 disposed at the inside in the radial direction of the vane body 42.

Figure 2:
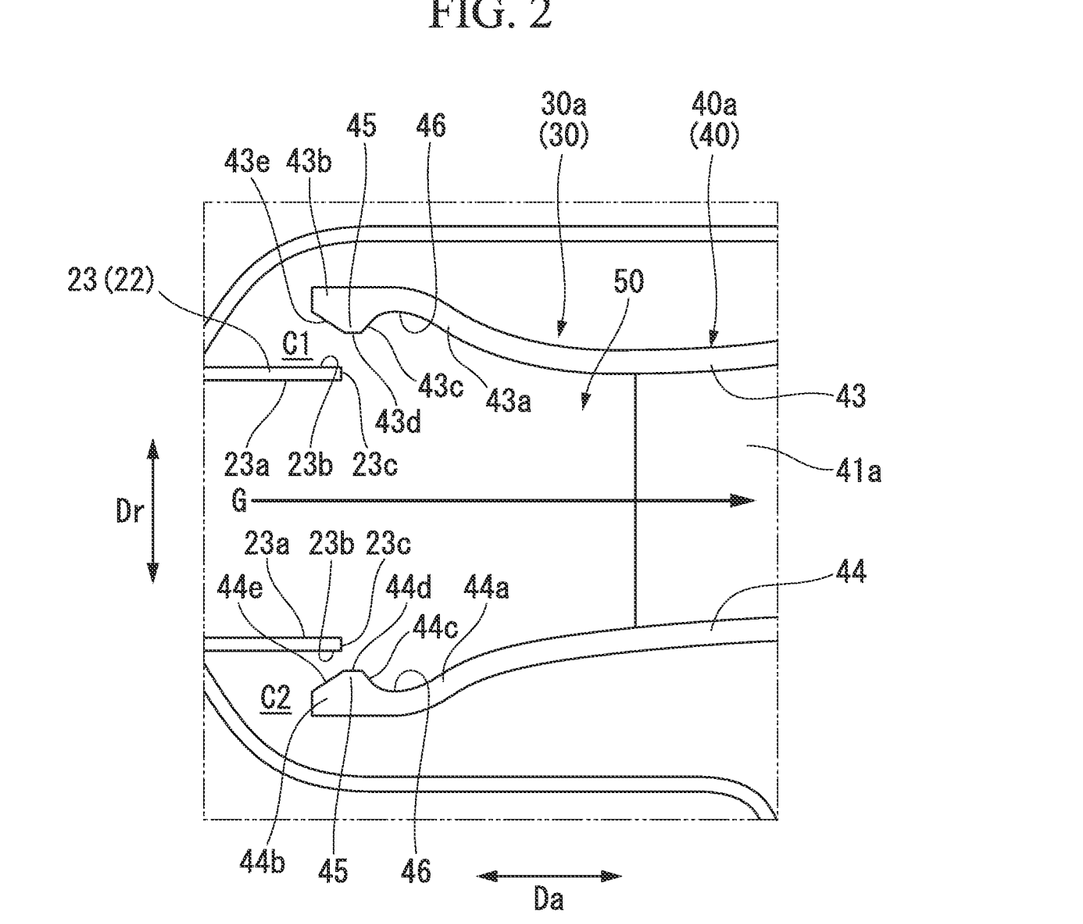
FIG. 2 is a cross-sectional view showing a cavity defined between respective modules of a combustor and a high-pressure turbine in the gas turbine.

As shown in FIGS. 1 and 2, the combustor 20 includes a transition piece 22 which sends a high-temperature and high-pressure combustion gas to the turbine 30 and a fuel supplier 21 which supplies fuel and compressed air into the transition piece 22. The outer shroud 43 and the inner shroud 44 of a vane 41a included in a first vane cascade 40a are arranged continuously downstream from a downstream side flange of the transition piece 22, that is, an outlet flange 23 in the axial direction Da.

Here, the fuel supplier 21 supplies fuel from an outside together with the compressed air supplied from the compressor 10 into the transition piece 22. The fuel burns in the transition piece 22 to generate the combustion gas. This combustion gas contacts the blade body 37 to rotate the turbine rotor 33 around the rotor shaft Ar, in the course of passing through a passage 50 between the outer shroud 43 and the inner shroud 44 of the plurality of vanes 41 included in the vane cascade 40, and between the platforms 38 of the plurality of blades 36 included in the blade cascade 35 in the downstream side and the shroud 39 formed in the outside in the radial direction of the blades 36.

As shown in FIG. 2, a cavity C1 is defined in the outside in the radial direction and a cavity C2 is defined in the inside in the radial direction between respective modules of the combustor 20 and the turbine 30.

In other words, the gas turbine 1 of this embodiment includes the outlet flange 23 which is the upstream side member, and the outer shroud 43 which is the downstream side member defining the cavity C1 with the outlet flange 23. In addition, the gas turbine 1 includes the outlet flange 23 which is the upstream side member, and the inner shroud 44 which is the downstream side member defining the cavity C2 with the outlet flange 23.

The outer shroud 43 and the inner shroud 44 include curved portions 43a and 44a which are formed to be curved to the side opposite to the passage 50 as it goes toward the upstream side. More specifically, the curved portion 43a of the outer shroud 43 is formed to be gradually curved in the outside in the radial direction as it goes toward the upstream side, and the curved portion 44a of the inner shroud 44 is formed to be gradually curved in the inside in the radial direction as it goes toward the upstream side. The upstream end portion 43b of the outer shroud 43 extends upstream from the axial direction Da, and reaches a position of the outside in the radial direction of the downstream end portion 23a of the outlet flange 23. On the other hand, the upstream end portion 44b of the inner shroud 44 extends upstream from the axial direction Da and reaches a position of the inside in the radial direction of the downstream end portion 23a of the outlet flange 23.

The outer shroud 43 includes a guide face 43c which is formed near the upstream end portion 43b thereof, faces the passage 50, and is arranged in the passage 50 side (in other words, the inside in the radial direction) as it goes toward the upstream side. Further, a plane 43d extending in the axial direction Da is formed upstream from the guide face 43c of the outer shroud 43. This plane 43d extends to a position of a wall portion 23c which is an end face of the downstream side of the outlet flange 23 in the axial direction Da. Further, a sloping face 43e arranged in the outside in the radial direction as it goes toward the upstream side is formed upstream from the plane 43d.

That is, the outer shroud 43 includes a protrusion 45 formed in the passage 50 side near the upstream end portion 43b thereof. The protrusion 45 includes the guide face 43c, the plane 43d and the sloping face 43e and has a substantially trapezoidal cross-sectional shape extending in the circumferential direction Dc. By this protrusion 45 and the above-mentioned curved portion 43a, a concave portion 46 opened to the passage 50 side is formed downstream from the protrusion 45.

Meanwhile, the inner shroud 44 includes a guide face 44c formed near the upstream end portion 44b thereof. The guide face 44c faces the passage 50 and is arranged in the passage 50 side (in other words, the outside in the radial direction) as it goes toward the upstream side. Further, a plane 44d extending in the axial direction Da is formed upstream from the guide face 44c of the inner shroud 44. This plane 44d extends to a position of the wall portion 23c which is the end face of the downstream side of the outlet flange 23 in the axial direction Da. A sloping face 44e arranged in the inside in the radial direction as it goes toward the upstream side is formed upstream from the plane 44d.

That is, like the outer shroud 43, the inner shroud 44 includes a protrusion 45 formed in the passage 50 side near the upstream end portion 44b thereof. The protrusion 45 includes the guide face 44c, the plane 44d and the sloping face 44e and has a substantially trapezoidal cross-sectional shape extending in the circumferential direction Dc. By this protrusion 45 and the above-mentioned curved portion 44a, a concave portion 46 opened to the passage 50 side is formed downstream from the protrusion 45.

Next, the above-mentioned guide face 44c of the inner shroud 44 will be described with reference to FIG. 6. Meanwhile, the guide face 44c of the inner shroud 44 and the guide face 43c of the outer shroud 43 have a shape substantially symmetrical about the passage 50 interposed therebetween. Therefore, only one example of the guide face 44c of the inner shroud 44 will be described.

Figure 6:
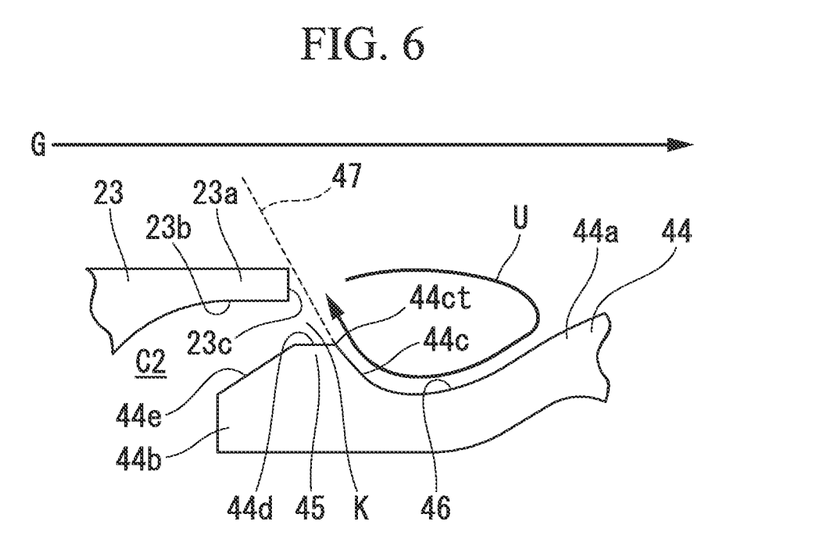
FIG. 6 is an enlarged view of a guide face in this embodiment.

As shown in FIG. 6, the guide face 44c of the inner shroud 44 in this embodiment is made of a concave-shape curved surface gradually arranged in the passage side as it goes toward the upstream side. In a cross section including an axis center of the rotor shaft Ar extending in the flow direction of the combustion gas G (the gas main stream) flowing in the passage 50, the guide face 44c is formed such that an extension section (illustrated by a broken line in FIG. 6) 47 of the guide face 44c continuing to the upstream end portion 44ct thereof is arranged downstream from a cavity inner wall portion (a first wall portion) 23b of the downstream end portion 23a of the outlet flange 23 facing the cavity C2, and more preferably downstream from the wall portion 23c (a second wall portion) of the outlet flange 23. Here, the state in which the guide face 44c and the extension section 47 are adjacent is a state in which the upstream end portion 44ct in the curved portion of the guide face 44c is in contact with the downstream end portion in the straight line section of the extension section 47, and the limit value of the upstream side in the curved portion of the guide face 44c and the limit value of the downstream side in the straight line portion of the extension section 47 coincide with each other in a cross-sectional view.

That is, as the guide face 44c is formed on the inner shroud 44, a swirling current U is generated due to the concave portion 46 formed near an opening portion K of cavity C2 when the combustion gas G flows toward the high-pressure turbine 30a from the outlet flange 23 of the combustor 20. This swirling current U is guided along the guide face 44c in the concave portion 46, and is returned to the passage 50 side along the extension section 47. At this time, as the extension section 47 is arranged downstream from the cavity inner wall portion 23b of the outlet flange 23, the swirling current U does not collide with the cavity inner wall portion 23b of the outlet flange 23. Meanwhile, like the inner shroud 44, the outer shroud 43 is also formed such that an extension section 47 continuing to the upstream end portion of the guide face 43c is arranged downstream from the cavity inner wall portion 23b facing the cavity C1 formed on the downstream end portion 23a of the outlet flange 23.

Thus, according to the gas turbine 1 of the above-mentioned embodiment, the swirling current U due to the entrainment from the main stream of the combustion gas G flows along the guide faces 43c and 44c, and the extension section 47 continuing to the upstream end portion of the guide faces 43c and 44c. Therefore, it is possible to reduce collision of the swirling current U of the combustion gas G due to the entrainment with the cavity inner wall portion 23b of the outlet flange 23 positioned upstream from the opening portion K of the cavities C1 and C2 so as to flow into the cavities C1 and 2. As a result, the clearance in the opening portion K of the cavities C1 and C2 is not narrowed, and the inflow of the combustion gas G into the cavities C1 and C2 can be reduced.

Further, since the inflow of the combustion gas G into the cavities C1 and C2 can be reduced, it is possible to prevent the temperature of the rotor body 34 or the like arranged in the cavities C1 and C2 from becoming high, and lowering the efficiency due to the decrease in the flow rate of the combustion gas G flowing in the passage 50.

Further, the present invention is not limited to the configuration of the above-mentioned embodiment, and it is possible to change the design within the range without departing from the gist of the present invention.

For example, in one example of the above-mentioned embodiment, the case of reducing the inflow of the combustion gas G into the cavities C1 and C2 formed between the respective modules of the combustor 20 and the turbine 30 has been described. But, as in a first modified example shown in FIG. 3, the present invention can also be applied to the cavities C3 and C4 formed between the respective modules of the high-pressure turbine 30a and the low-pressure turbine 30b.

As shown in FIG. 3, the shroud 39 of the blade cascade 35 located furthest downstream of the high-pressure turbine 30a is adjacent to the outer shroud 43 of the vane cascade 40 located furthest upstream of the low-pressure turbine 30b in the axial direction Da. Likewise, the platform 38 of the blade cascade 35 located furthest downstream of the high-pressure turbine 30a is adjacent to the inner shroud 44 of the vane cascade 40 located furthest upstream of the low-pressure turbine 30b in the axial direction Da. The passage 50 of the high-pressure turbine 30a defined by the shroud 39 and the platform 38 communicates in the axial direction Da with the passage 50 of the low-pressure turbine 30b defined by the outer shroud 43 and the inner shroud 44, so that combustion gas G can flow therein.

The gas turbine 1 includes the shroud 39 of the high-pressure turbine 30a which is the upstream side member, and the outer shroud 43 of the low-pressure turbine 30b which is the downstream side member defining a cavity C3 with the shroud 39, and includes the platform 38 of the high-pressure turbine 30a which is the upstream side member, and the inner shroud 44 of the low-pressure turbine 30b which is the downstream side member defining a cavity C4 with the platform 38.

The outer shroud 43 located furthest upstream of the low-pressure turbine 30b includes the curved portion 43a formed to be curved to the side opposite to the passage 50 as it goes toward the upstream side, and the inner shroud 44 includes the curved portion 44a formed to be curved to the side opposite to the passage 50 as it goes toward the upstream side. The upstream end portion 43b of the outer shroud 43 is arranged in the outside in the radial direction of the downstream end portion 39g of the shroud 39 and the upstream end portion 44b of the inner shroud 44 is arranged in the inside in the radial direction of the downstream end portion 38g of the platform 38.

The outer shroud 43 located furthest upstream of the low-pressure turbine 30b includes a guide face 43c which faces the passage 50 near the upstream end portion 43b thereof, and is arranged in the passage 50 side as it goes toward the upstream side. The inner shroud 44 located furthest upstream of the low-pressure turbine 30b includes a guide face 44c which faces the passage 50 near the upstream end portion 44b thereof, and is arranged in the passage 50 side as it goes toward the upstream side.

For the guide face 43c, in the cross-section including the axis center of the rotor shaft Ar extending in the flow direction of the combustion gas G (the gas main stream) flowing in the passage 50, the guide face 43c is formed such that the extension section (illustrated by a broken line in FIG. 3) 47 of the guide face 43c continuing to the upstream end portion 43ct thereof is arranged downstream from the cavity inner wall portion (the wall portion) 39h of the shroud 39 facing the cavity C3, and more preferably downstream from the wall portion 39f of the downstream end portion 39g of the shroud 39. Likewise, in the cross-section including the axis center of the rotor shaft Ar extending in the flow direction of the combustion gas G flowing in the passage 50, the guide face 44c is formed such that the extension section (illustrated by a broken line in FIG. 3) 47 of the guide face 44c continuing to the upstream end portion 44ct thereof is arranged downstream from the cavity inner wall portion (the wall portion) 38h of the platform 38 facing the cavity C4, and more preferably downstream from the wall portion 38f of the downstream end portion 38g of the platform 38.

That is, like the above-mentioned embodiment, the swirling current U due to the entrainment from the main stream of the combustion gas G flows along the guide faces 43c and 44c, and the extension section 47 of the guide faces 43c and 44c continuing to the upstream end portions 43ct and 44ct of the guide faces 43c and 44c. Therefore, it is possible to reduce collision of the swirling current U of the combustion gas G due to the entrainment with the shroud 39 which is the upstream side member forming the opening portion K of the cavities C3 and C4 and the platform 38 so as to flow the combustion gas G into the cavities C3 and C4. As a result, the clearance in the opening portion K of the cavities C3 and C4 is not narrowed, and the inflow of the combustion gas G into the cavities C3 and C4 can be reduced.

Further, the configuration for reducing the inflow of the combustion gas G into the above-mentioned cavities C1 to C4 can also be applied to the cavity formed in the same module, as shown in FIGS. 4 and 5 as a second modified example.

FIG. 4 shows cavities C5 and C6 formed between the blade cascade 35 arranged upstream and the vane cascade 40 arranged downstream, in the same module of the high-pressure turbine 30a or the low-pressure turbine 30b. In addition, FIG. 5 shows cavities C7 and C8 formed between the vane cascade 40 arranged upstream and the blade cascade 35 arranged downstream, in the same module of the high-pressure turbine 30a or the low-pressure turbine 30b.

When the entrainment of the combustion gas G into the cavities C5 and C6 is reduced as in FIG. 4, guide faces 43c and 44c with the same shape as those of the above-mentioned guide faces 43c and 44c may be formed in the outer shroud 43 and the inner shroud 44 of the vane cascade 40 which is the downstream side member. Further, when the entrainment of the combustion gas G into the cavities C7 and C8 is reduced as in FIG. 5, guide faces 38c and 39c with the same shape as those of the above-mentioned guide faces 43c and 44c may be formed in the shroud 39 and the platform 38 of the blade cascade 35 which is the downstream side member.

In these cases, like the above-mentioned embodiment, the respective guide faces 38c, 39c, 43c and 44c are formed such that the extension section 47 is arranged downstream from the cavity inner wall portions 38h, 39h, 43h and 44h of the upstream side members facing the respective cavities C5 to C8, and more preferably downstream from the wall portions 38f, 39f, 43f and 44f which are the end faces of the downstream end portions of the upstream side members.

Thereby, it is possible to reduce the inflow of the combustion gas G into these cavities C5 to C8 due to the entrainment, even when the cavities C5 to C8 communicating with the passage 50 are formed in the same module, without being limited to the case in which cavities are formed between various modules.

Further, the present invention is not limited to the configuration of the above-mentioned embodiments. For example, in order to reduce the inflow of the combustion gas G into the cavity, a part of the compressed air compressed by the compressor 10 or the compressed air extracted from the compressor 10 may be ejected as cooling air to the passage 50 from at least one of the cavities C1 to C8, for example.

In this case, it is possible to suppress combustion gas G from flowing into any one of the cavities C1 to C8 from which the cooling air is ejected. Therefore, it is not necessary to increase the flow rate of the cooling air to suppress the rise in the temperature of internal parts, and it is possible to suppress the decrease in efficiency due to the low-temperature cooling air mixing into the high-temperature combustion gas, for example.

Figure 7:
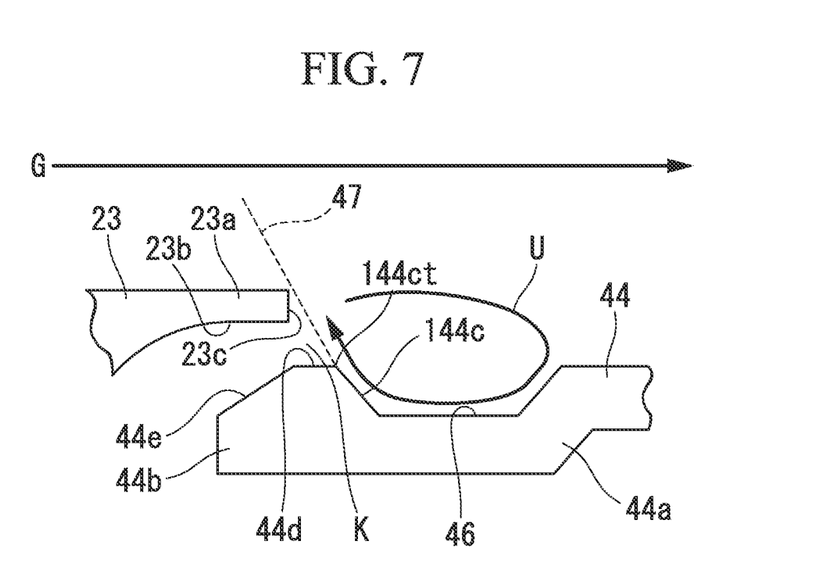
FIG. 7 is an enlarged view corresponding to FIG. 6 in a modified example of this embodiment.

Further, the case in which each of the above-mentioned guide faces 38c, 39c, 43c and 44c has a concave curved surface has been described. However, if the guide face is the face arranged in the passage 50 side as it goes toward the upstream side, the guide face is not limited to the curved surface. For example, as shown in FIG. 7, the face may be formed as a guide face 144c of a plane shape. Even in this case, the guide face 144c is formed such that the extension section 47 of the guide face 144c continuing to the upstream end portion 144ct of the guide face 144c is arranged downstream from the cavity inner wall portion 23b of the outlet flange 23, and more preferably downstream from the wall portion 23c of the downstream end portion 23a. Meanwhile, the same parts in FIG. 7 are denoted by the same symbols as those of FIG. 6, and repeated description thereof is omitted.

Further, in the above-mentioned embodiment, the case of reducing the inflow of the combustion gas G for the two cavities arranged in both the outside in the radial direction and the inside in the radial direction, for example, the cavities C1 and C2, the cavities C3 and C4, the cavities C5 and C6 and the cavities C7 and C8 has been described. But, only the inflow of the combustion gas G into any one of the cavities in the outside in the radial direction and in the inside in the radial direction may be reduced.

In addition, in the above-mentioned embodiment, the case in which any one of the guide faces 43c, 44c, 38c and 39c is formed in all of the respective downstream side members defining the cavities C1 to C8 has been described. However, the above-mentioned guide faces 38c, 39c, 43c and 44c may be formed only in the downstream side members defining a cavity into which the inflow of the combustion gas G is to be reduced among the cavities C1 to C8.

Further, in the above-mentioned embodiment, the case in which the turbine 30 includes the high-pressure turbine 30a and the low-pressure turbine 30b has been described. However, the configuration is not limited thereto, the turbine 30 may include a combination of three or more turbine modules, such as high-pressure, medium-pressure, low-pressure, for example. The turbine 30 may include only one turbine module.

As described above, the preferred embodiment of the present invention is described. However, the present invention is not limited to the embodiment. Addition, omission, substitution, and other modifications of the configuration are possible within the scope which does not depart from the gist of the present invention. The present invention is not limited by the above-described explanation, and is limited only by the scope of the attached claims.

What is claimed is:

1. A gas turbine comprising:
   an upstream side member facing a passage of a gas main stream, the upstream side member being downstream of a combustor; and
   a downstream side member disposed downstream from the upstream side member to define a cavity with the upstream side member,
   wherein the upstream side member includes
      a first wall portion of a downstream side end portion of the upstream side member, the first wall portion facing the cavity so as to form an inner wall of the cavity, and
      a second wall portion which is an end face of a downstream side of the upstream side member,
   wherein the downstream side member includes a guide face facing the passage and having a concave-shape surface arranged in the passage side as the guide face goes toward an upstream side, and
   when viewed in a cross section in which the upstream side member and the downstream side member are cut along a rotor shaft, an upstream side end portion of the guide face is formed such that a swirling current flows along the guide face and an extension section of the guide face without colliding with the upstream side member, the extension section being a line extending from an upstream most end of the guide face toward the upstream side in a direction substantially parallel to a surface of the upstream side end portion of the guide face, and wherein the extension section does not intersect with the upstream side member.

2. The gas turbine according to claim 1, wherein the extension section is arranged downstream of the second wall portion.

3. The gas turbine according to claim 1, further comprising:
   a combustor which injects a fuel into compressed air to burn the fuel; and
   a turbine part disposed adjacent to a downstream side of the combustor along the gas main stream, wherein the upstream side member is disposed at the combustor, and
   the downstream side member is disposed at the turbine part.

4. The gas turbine according to claim 2, further comprising:
   a combustor which injects a fuel into compressed air to burn the fuel; and
   a turbine part disposed adjacent to a downstream side of the combustor along the gas main stream, wherein the upstream side member is disposed at the combustor, and
   the downstream side member is disposed at the turbine part.

5. The gas turbine according to claim 1, further comprising a turbine part in which a vane part and a blade part are arranged in the flow direction of the gas main stream,
   wherein the upstream side member is disposed at one of the vane part and the blade part, which is arranged upstream from the gas main stream, and the downstream side member is disposed at the other of the vane part and the blade part.

6. The gas turbine according to claim 2, further comprising a turbine part in which a vane part and a blade part are arranged in the flow direction of the gas main stream,
   wherein the upstream side member is disposed at one of the vane part and the blade part, which is arranged upstream from the gas main stream, and the downstream side member is disposed at the other of the vane part and the blade part.

7. The gas turbine according to claim 1, wherein
   a first turbine part and a second turbine part are arranged in sequence from the upstream side of the flow direction of the gas main stream,
   the upstream side member is disposed at the first turbine part, and
   the downstream side member is disposed at the second turbine part.

8. The gas turbine according to claim 2, wherein
   a first turbine part and a second turbine part are arranged in sequence from the upstream side of the flow direction of the gas main stream,
   the upstream side member is disposed at the first turbine part, and
   the downstream side member is disposed at the second turbine part.

9. The gas turbine according to claim 1, wherein
   the upstream side member and the downstream side member are formed in at least one of an inner side and an outer side in a radial direction of the passage.

10. The gas turbine according to claim 2, wherein
    the upstream side member and the downstream side member are formed in at least one of an inner side and an outer side in a radial direction of the passage.

11. The gas turbine according to claim 3, wherein
    the upstream side member and the downstream side member are formed in at least one of an inner side and an outer side in a radial direction of the passage.

12. The gas turbine according to claim 4, wherein
    the upstream side member and the downstream side member are formed in at least one of an inner side and an outer side in a radial direction of the passage.

13. The gas turbine according to claim 5, wherein
    the upstream side member and the downstream side member are formed in at least one of an inner side and an outer side in a radial direction of the passage.

14. The gas turbine according to claim 6, wherein
the upstream side member and the downstream side member are formed in at least one of an inner side and an outer side in a radial direction of the passage.

15. The gas turbine according to claim 7, wherein
the upstream side member and the downstream side member are formed in at least one of an inner side and an outer side in a radial direction of the passage.

16. The gas turbine according to claim 8, wherein
the upstream side member and the downstream side member are formed in at least one of an inner side and an outer side in a radial direction of the passage.

17. A gas turbine comprising:
an upstream side member facing a passage of a gas main stream, the upstream side member being downstream of a combustor; and
a downstream side member disposed downstream from the upstream side member to define a cavity with the upstream side member,
wherein the upstream side member includes
    a first wall portion of a downstream side end portion of the upstream side member, the first wall portion facing the cavity so as to form an inner wall of the cavity, and
    a second wall portion which is an end face of a downstream side of the upstream side member,
wherein the downstream side member includes a guide face facing the passage and having a concave-shape surface arranged in the passage side as the guide face goes toward an upstream side, and
when viewed in a cross section in which the upstream side member and the downstream side member are cut along a rotor shaft, an upstream side end portion of the guide face is formed such that a swirling current flows along the guide face and an extension section of the guide face without colliding with the upstream side member, the extension section being a line extending from an upstream most end of the guide face toward the upstream side in a direction substantially tangential to a curvature of the upstream side end portion of the guide face, and wherein the extension section does not intersect with the upstream side member.

18. The gas turbine according to claim 17, wherein
the extension section is arranged downstream of the second wall portion.

19. The gas turbine according to claim 17, further comprising:
    a combustor which injects a fuel into compressed air to burn the fuel; and
    a turbine part disposed adjacent to a downstream side of the combustor along the gas main stream, wherein
    the upstream side member is disposed at the combustor, and
    the downstream side member is disposed at the turbine part.

20. The gas turbine according to claim 18, further comprising:
    a combustor which injects a fuel into compressed air to burn the fuel; and
    a turbine part disposed adjacent to a downstream side of the combustor along the gas main stream, wherein
    the upstream side member is disposed at the combustor, and
    the downstream side member is disposed at the turbine part.

21. The gas turbine according to claim 17, further comprising
    a turbine part in which a vane part and a blade part are arranged in the flow direction of the gas main stream,
    wherein the upstream side member is disposed at one of the vane part and the blade part, which is arranged upstream from the gas main stream, and the downstream side member is disposed at the other of the vane part and the blade part.

22. The gas turbine according to claim 18, further comprising
    a turbine part in which a vane part and a blade part are arranged in the flow direction of the gas main stream,
    wherein the upstream side member is disposed at one of the vane part and the blade part, which is arranged upstream from the gas main stream, and the downstream side member is disposed at the other of the vane part and the blade part.

23. The gas turbine according to claim 17, wherein
a first turbine part and a second turbine part are arranged in sequence from the upstream side of the flow direction of the gas main stream,
the upstream side member is disposed at the first turbine part, and
the downstream side member is disposed at the second turbine part.

24. The gas turbine according to claim 18, wherein
a first turbine part and a second turbine part are arranged in sequence from the upstream side of the flow direction of the gas main stream,
the upstream side member is disposed at the first turbine part, and
the downstream side member is disposed at the second turbine part.

25. The gas turbine according to claim 17, wherein
the upstream side member and the downstream side member are formed in at least one of an inner side and an outer side in a radial direction of the passage.

26. The gas turbine according to claim 18, wherein
the upstream side member and the downstream side member are formed in at least one of an inner side and an outer side in a radial direction of the passage.

27. The gas turbine according to claim 19, wherein
the upstream side member and the downstream side member are formed in at least one of an inner side and an outer side in a radial direction of the passage.

28. The gas turbine according to claim 20, wherein
the upstream side member and the downstream side member are formed in at least one of an inner side and an outer side in a radial direction of the passage.

29. The gas turbine according to claim 21, wherein
the upstream side member and the downstream side member are formed in at least one of an inner side and an outer side in a radial direction of the passage.

30. The gas turbine according to claim 22, wherein
the upstream side member and the downstream side member are formed in at least one of an inner side and an outer side in a radial direction of the passage.

31. The gas turbine according to claim 23, wherein
the upstream side member and the downstream side member are formed in at least one of an inner side and an outer side in a radial direction of the passage.

32. The gas turbine according to claim 24, wherein
the upstream side member and the downstream side member are formed in at least one of an inner side and an outer side in a radial direction of the passage.

* * * * *